United States Patent
Hong et al.

(10) Patent No.: US 10,079,486 B2
(45) Date of Patent: Sep. 18, 2018

(54) SECURING AGAINST MALICIOUS CONTROL OF CIRCUIT BREAKERS IN ELECTRICAL SUBSTATIONS

(71) Applicant: ABB Inc., Cary, NC (US)

(72) Inventors: Junho Hong, Raleigh, NC (US); Reynaldo Nuqui, Cary, NC (US)

(73) Assignee: ABB Inc., Cary, NC (US)

( * ) Notice: Subject to any disclaimer, the term of this patent is extended or adjusted under 35 U.S.C. 154(b) by 245 days.

(21) Appl. No.: 14/958,570

(22) Filed: Dec. 3, 2015

(65) Prior Publication Data

US 2017/0163029 A1    Jun. 8, 2017

(51) Int. Cl.
    *H02H 7/26* (2006.01)
(52) U.S. Cl.
    CPC .......... *H02H 7/262* (2013.01); *H02H 7/263* (2013.01)
(58) Field of Classification Search
    CPC .............................. H02H 7/262; H02H 7/263
    See application file for complete search history.

(56) References Cited

U.S. PATENT DOCUMENTS

| 4,767,947 A | 8/1988 | Shah et al. | |
|---|---|---|---|
| 7,343,360 B1 * | 3/2008 | Ristanovic | G06Q 30/08 |
| | | | 705/412 |
| 7,620,517 B2 * | 11/2009 | Scholtz | H02G 7/02 |
| | | | 702/130 |
| 8,756,047 B2 * | 6/2014 | Patel | G06N 3/08 |
| | | | 703/18 |
| 2005/0116814 A1 | 6/2005 | Rodgers et al. | |
| 2008/0197715 A1 * | 8/2008 | Karlsson | H02H 3/066 |
| | | | 307/125 |

(Continued)

FOREIGN PATENT DOCUMENTS

WO    2006043871    4/2006

OTHER PUBLICATIONS

Hazarika,"Line outage contingency analysis including the system islanding scenario," 2004, National Power systems conference, pp. 322-327.*

(Continued)

*Primary Examiner* — Thienvu Tran
*Assistant Examiner* — Pinping Sun
(74) *Attorney, Agent, or Firm* — Taft Stettinius & Hollister LLP; J. Bruce Schelkopf

(57) ABSTRACT

An example method for detecting and mitigating attacks on electric power substations comprises detecting a command to open or close a circuit breaker in the electric power substation. A modified extended substation model for the electric power substation is generated, based on the detected command and based on measurements in substation, where the modified extended substation model is a power flow model for the substation and for one or more directly connected neighboring substations. A power flow analysis is performed, using the modified extended substation model, to generate a predicted voltage for each of a plurality of nodes in the substation and in the one or more directly connected neighboring substations. Each predicted voltage is compared to a corresponding allowable voltage range, and execution of the command is blocked in response to determining that one or more of the voltages is outside the corresponding allowable voltage range.

9 Claims, 8 Drawing Sheets

(56) References Cited

U.S. PATENT DOCUMENTS

| | | | |
|---|---|---|---|
| 2009/0278653 A1* | 11/2009 | Jachmann | G05B 19/042 340/5.2 |
| 2012/0022713 A1* | 1/2012 | Deaver, Sr. | G05B 17/02 700/298 |
| 2013/0169327 A1* | 7/2013 | Helio | H03L 7/06 327/156 |
| 2013/0274941 A1 | 10/2013 | Khozikov et al. | |
| 2015/0137598 A1* | 5/2015 | Hawawini | G01R 31/00 307/31 |
| 2016/0301199 A1 | 10/2016 | Mori et al. | |
| 2016/0320785 A1* | 11/2016 | Kondabathini | G05F 1/66 |

OTHER PUBLICATIONS

"Power flow analysis" 2012, pp. 1-64.*

Power world, "power flow analysis and voltage control using simulator" 2008, pp. 1-68.*

Kondabathini, et al., "Secured Control of Circuit Breakers in a Digital Substation", Unpublished U.S. Appl. No. 14/700,918, filed Apr. 30, 2015.

Liu, Chen-Ching et al., "Intruders in the Grid", IEEE Power Energy Magazine, vol. 10, No. 1, Feb. 2012, 58-66.

Unknown, Author, "Bay control REC670 ANSI", ABB, Application Manual, 2010, 1-574.

* cited by examiner

SECURING AGAINST MALICIOUS CONTROL OF CIRCUIT BREAKERS IN ELECTRICAL SUBSTATIONS

STATEMENT REGARDING FEDERALLY SPONSORED RESEARCH OR DEVELOPMENT

This invention was made with U.S. Government support under Cooperative Agreement No. DE-OE0000674 awarded by the US Department of Energy (DOE). The Government has certain rights in this invention.

TECHNICAL FIELD

The present disclosure is related to electric power systems and is more particularly related to controlling circuit breakers in electric power substations.

BACKGROUND

Electric power substations are critical elements of the power grid, installed with power system components such as transformers, busbars, and circuit breakers arranged to ensure reliable and adequate transmission and distribution of electric power. Measurements from substations, such as from Intelligent Electronic Devices (IEDs), are used as input to Energy Management System (EMS) software applications, including state estimation and optimal power flow for monitoring and control of the electric system. Both "cyber devices" and "physical devices" can be physically and/or electrically connected in the substation. For example, a protection and control unit of a transformer (a physical device) is connected to a user interface (a cyber device), for control purposes, via the substation local area network.

In digital substations, microprocessor-based Intelligent Electronic Devices (IEDs) are used to control power system switching devices such as circuit breakers, reclosers, etc. With the standardization by the International Electrotechnical Commission (IEC) of the IEC 61850 process bus, most modern IEDs now support voltage and current inputs in a digital format, as Sampled Value (SV) streams transmitted as Ethernet packets on the process bus. In implementations according to the IEC61850-9-2 specifications, a merging unit (MU) is the device that samples the analog measurements (voltages and currents) of the primary high voltage power circuit, encodes the measurement values into Ethernet packets, and injects them onto the process bus. The IED receives these SV packets from the process bus, processes them, and uses the SV as the inputs to its various fault detection and protection functions.

More particularly, the IED processes the SV values with an internal Discrete Fourier Transform function to convert the SV streams into phasor values. The phasors are time-synchronized within an electrical power substation and can be published on the station bus, through Manufacturing Message Specification (MMS) reporting or according to the IEEE Standard for Synchrophasor Measurements for Power Systems (IEEE C37.1118-2011), for example. Phasor information can also be made available on the station bus through GOOSE (Generic Object Oriented Substation Events) messaging.

The IED thus operates on the basis of measured signals (e.g., voltages and currents, etc.) from attached sensors, signals from other IEDs indicating the state of their controlled elements, and signals from a supervisory system. The IED can also generate signals to act on its switching elements, to communicate its state to other IEDs or to inform the supervisory system. These signals are either hardwired or transmitted as network messages, for instance according to IEC 61850.

One key function of the IED is to detect that a fault happens on the primary circuit and to issue a "trip" command to activate a switching device and thus disconnect the faulty parts of the circuit. During this process, the analog inputs to the MUs and the resulting digitized SV packets are critical to the proper operation decision of the IEDs. Compared to earlier protection systems that relied on hardwired analog inputs, the use of digitized sample value streams and Ethernet technology opens the doors to cyber-attacks on the digitized sample value data. An attacker, once gaining access to the process bus or to a merging unit, can modify the SV packets received by the corresponding IED, and thus can manipulate the protection system and, potentially, cause serious consequences to the power grid. For example, a false trip on normally healthy circuits could cause the system to weaken in such a way that might lead to localized or regional grid collapse.

In addition to its primary protection function, an IED can include a control function for direct operation, whereby the IED executes commands from the operator, in particular to open and close assigned switching elements. An operator can initiate a control command from the Control Center (CC), the Station Human-Machine Interface (HMI), or the Local HMI on the front of the IED. Alternatively, the command can also be executed by directly manipulating a protection device control data object in the IEC 61850 hierarchy, by gaining access to the station bus.

Remote access to substation networks is a common way for control and maintenance of substation facilities. However, there is a potential cyber-security issue in remote access operation. An unauthorized direct control attack to important substations may be used to open multiple circuit breakers, for example, which could trigger multiple, cascaded sequences of events, leading to a blackout. As a result, it is crucial to enhance the cyber security of substations and analyze cyber security and physical security as one integrated structure, to enhance the resilience of power grids.

An appropriate mitigation strategy for dealing with attacks on substations is vital. Mitigation techniques can be applied on the cyber side of the system (i.e., in the Information and Communication Technology components of the electric power system), as well as to the physical system components. A key to cyber mitigation is to find anomalous activities or malicious behaviors, and disconnect or stop the intrusion. However, pure cyber mitigation still has vulnerabilities, since it can be compromised by well-trained intruders or may have unacceptable intrusion-detection performance. Unacceptable performance may include, for example, either an excessive false-positive ratio or an excessive false-negative ratio, where the false-positive ratio is defined as the number of misclassified normal activities divided by the total number of normal activities and the-false negative ratio is defined as the number of undetected abnormal activities divided by the total number of abnormal activities.

Accordingly, improved techniques and devices are needed for securing substations against malicious control operations.

SUMMARY

Embodiments of the presently disclosed techniques and apparatus provide methods and systems for detecting and mitigating direct control attacks on electric power substations. An example method is performed in at least one device in an electric power substation, and comprises detecting a command to open or close a circuit breaker in the electric power substation. A modified extended substation model for the electric power substation is generated, based on the detected command and based on measurements in the electric power substation, where the modified extended substation model is a power flow model for the electric power substation and for one or more directly connected neighboring substations. A power flow analysis is performed, using the modified extended substation model, to generate a predicted voltage for each of a plurality of nodes in the electric power substation and in the one or more directly connected neighboring substations. Each predicted voltage is compared to a corresponding allowable voltage range, and execution of the command is blocked in response to determining that one or more of the voltages is outside the corresponding allowable voltage range.

Another example method also includes detecting a command to open or close a circuit breaker in the electric power substation. Likewise, the method further comprises generating a modified extended substation model for the electric power substation, based on the detected command and based on measurements in the electric power substation. Again, the modified extended substation model is a power flow model for the electric power substation and for one or more directly connected neighboring substations. In this example method, however, it is determined that power flow calculations using the modified extended substation model do not converge. In response, the execution of the command is blocked. This blocking may be further in response to determining that a Jacobian matrix of the modified extended substation model is evaluated to be singular, in some embodiments.

Variations of the above-summarized method are described in the detailed description that follows, as are apparatuses configured to carry out any of one or more of these methods.

DETAILED DESCRIPTION

In the claims and discussion that follows, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. The articles "a", "an" and "the" are intended to include the plural as well as the singular, unless the context clearly indicates otherwise. Like terms refer to like elements throughout the description.

Figure 1:
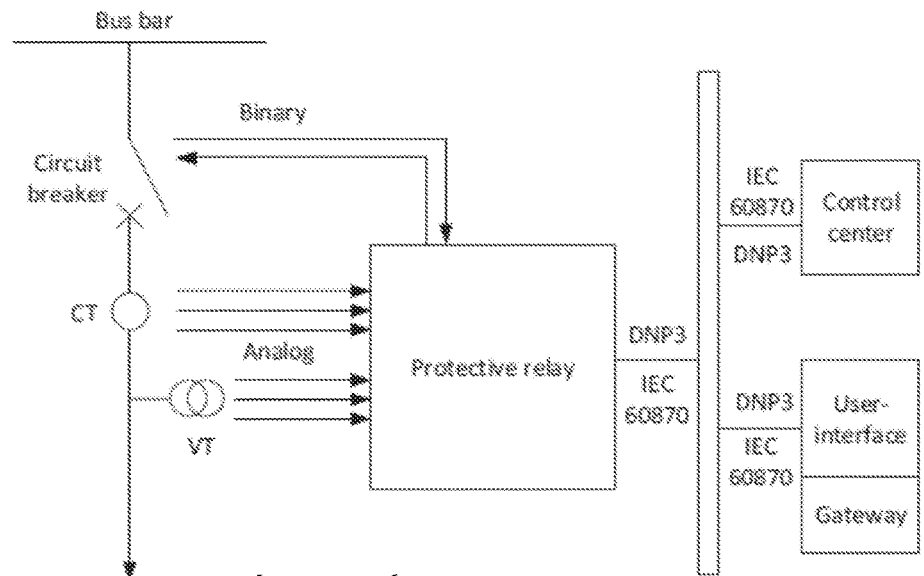
FIG. 1 illustrates a conventional electric power substation.
Figure 2:
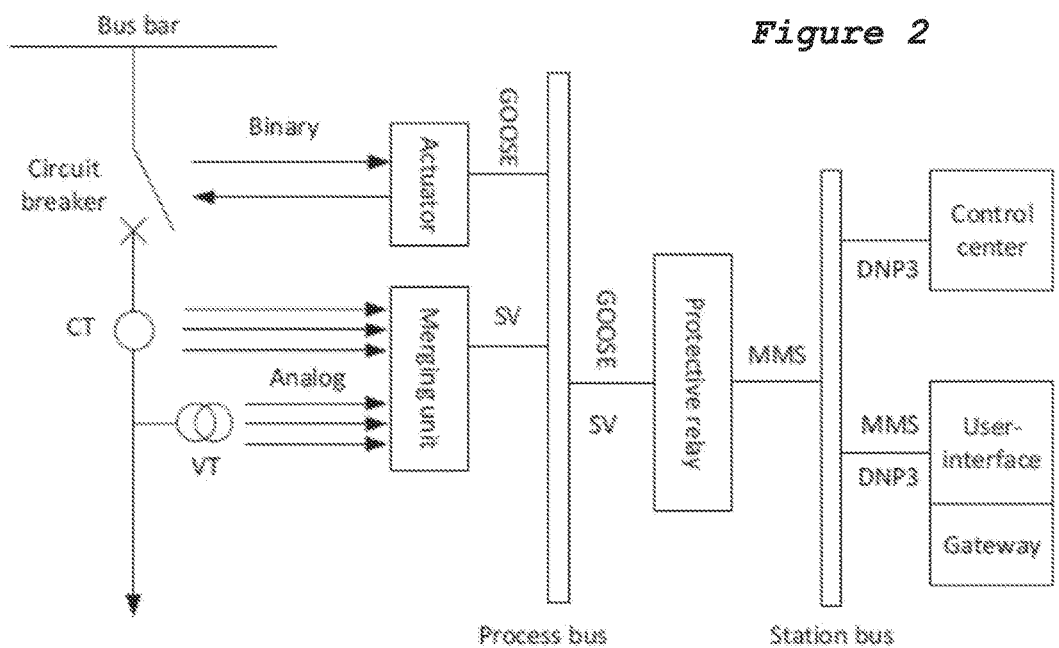
FIG. 2 shows a digital electric power substation.

Today's electric power systems may include highly automated digital substations, which may include various combinations of supervisory control and data acquisition (SCADA) systems, remote terminal (RTUs), and high-speed digital interconnections, as well as the IEDs discussed earlier. More conventional substations may also be used. FIG. 1 illustrates some elements of an example conventional substation, while FIG. 2 illustrates features of a corresponding digital substation. While the "conventional" substation in FIG. 1 includes basic SCADA interfaces and protocols (e.g., the IEC 60870 communication profile and the DNP3 protocol) for controlling a protective relay, the "digital" substation in FIG. 2 includes IEDs that monitor voltages and currents, communicating sampled values (SVs) on a local process bus. Commands to control a circuit breaker may be automatically generated, or generated by a local or remote operator, in which case the commands are referred to as direct control commands. In both the conventional and digital subsystems, however, it will be appreciated that protective devices such as circuit breakers can be directly controlled, whether via a local user interface, via a remote control center, or via unauthorized access to the station bus and/or process bus. This leaves both types of substation susceptible to maliciously generated direct control commands, which can lead to cascading system failures, blackouts, etc.

Cyber intrusions to substations of a power grid are a potentially critical source of vulnerability for the electric power system, since most substations carry the bulk load that is distributed to the grid. In the worst case, cyber intrusions into high-voltage substations, for the purpose of maliciously switching protective devices and/or causing the sensors to relay malicious signals to protective devices, can lead to severe cascading events, causing catastrophic power outages.

The techniques presented herein provide for the prevention and/or mitigation of malicious or inadvertent direct control of circuit breakers in electrical substations, based on prediction of abnormal bus voltages or voltage collapse in an electrical substation. Rather than attempting to detect cyber intrusions through cyber-based analysis, these techniques uses the physics of the power system to detect intrusions that execute a direct control attack (e.g., via a command to open a circuit breaker in a substation). Importantly, these techniques can mitigate the effects of malicious cyber intrusions as well as malicious locally generated commands.

In the techniques detailed below, the consequence of a direct switching command is evaluated in a system model that is composed of the electrical substation and its neighboring substation, updated periodically using measurements from the power system. This system model is composed of line and equipment impedances and their connections, with sufficient accuracy to estimate system voltages and predict voltage collapse.

One way to defend against cyber intrusion is to analyze and assess the operational consequences of the attack and block the action if the consequence results in damage, weakening, or compromising the ability of the system to deliver reliable electric power. Such analysis must rely on the physical system model with which the impact is analyzed. Direct control of switching devices in substations creates changes in power flows and voltages in the substation and around it. The consequence of changing the status of a circuit breaker can thus be analyzed using the system static model. Such analysis can reveal overvoltage in the substation or overloading of the equipment connected within the substation.

Power flow programs are reliable tools for predicting the state of the power system, where the state is normally represented in terms of the bus voltage magnitudes and angles. The power flow calculation is widely used for power grid operation in Supervisory Control and Data Acquisition (SCADA) system. Power flow results help system operators to anticipate the voltage and angle at each bus and active and reactive powers at each transmission line, before the operators take a control action.

However, it is computationally burdensome to simulate the whole power grid, especially as operated by multiple independent system operators (ISOs). Accordingly power system model reduction has been widely used as an approach to approximate the less relevant parts of a power system for system modeling purposes. These less relevant parts could be, for example, external control areas, or the distribution system.

To make timely assessments of the potential impact of directly controlling circuit breakers in a substation, however, it is necessary to perform that assessment locally. System-wide power flow analysis is too complex, and relies on the collection of measurement data and device status information from across the system. Furthermore, it is good practice to distribute layers of security between the control center and the substations. It is thus recognized that running system-wide power flow analysis at each substation is deemed impractical, as the relevant data for the entire power system (e.g., generation, transmission branch parameters and customer loads) is not normally stored in the substation, but is instead stored in the control center.

The substation itself, however, always has the most up-to-date information on its own measurements and switch status, and can also have recent information regarding the device statuses and bus voltages for directly connected neighboring substations. Accordingly, a localized system for detecting and mitigating malicious direct commands, as described herein, provides timelier and more robust security. The techniques and systems detailed herein may be employed to prevent and/or mitigate direct control attacks on electrical substation switches, such as circuit breakers by analyzing and predicting the operational consequences of the cyber-attack to power grid, using a power-system-domain layer, rather than relying on the direct detection of unauthorized access to the digital systems. The protective layer against direct control is stored within the substation. It makes use of real-time substation measurements, switch statuses, and power flow simulations to predict the impact of direct control on circuit breakers. A power flow problem is built and updated using the latest measurements available at the substation, and used to predict adverse consequences of direct control commands before the commands are actually implemented, thus allowing malicious commands to be blocked. It will be appreciated that these techniques and systems may use the outputs of protective relays or actuators as inputs, which means that the mitigation and protection schemes described herein may be employed in both "conventional" and "digital" substations.

Figure 3:
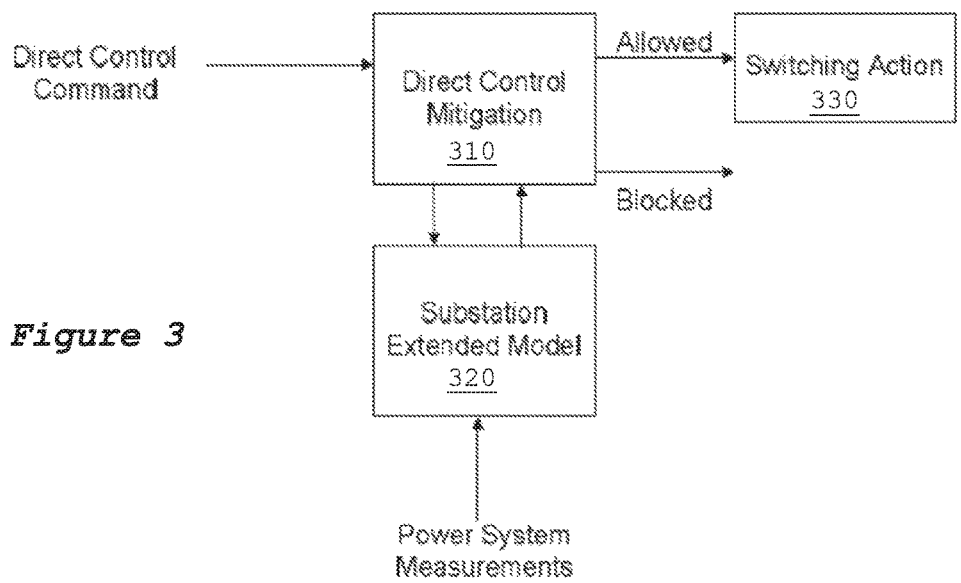
FIG. 3 is a high-level illustration of the mitigation techniques described herein.

FIG. 3 is a schematic diagram illustrating elements of the inventive techniques described herein. As seen in the figure, a direct control command is intercepted by a direct control mitigation function 310, which uses a substation extended model 320 to determine whether to allow the command, in which case a switching action 330 is triggered, or to block the command.

In some embodiments, the mitigation system updates its substation extended model whenever a direct control command to switch a breaker is received, to keep the model at par with the current system conditions when the request is received. In other embodiments, the substation extended model may be updated periodically, at an interval that is short enough to ensure that the model is sufficiently up to date at any given time. In either case, the direct control command triggers the execution of a power flow problem, using the substation extended model and the subsystem change that would result from the execution of the command, resulting in predicted voltages and power flows in the extended model of the substation. If any of the predicted voltages resulting from the direct control command is beyond a corresponding emergency limit and/or if the power flow analysis indicates that execution of the command will result in further uncontrolled switching actions, such as over-voltage or under-voltage protection actions, then the attempted direct control command is blocked by the invention. Otherwise, the action is allowed.

Figure 4:
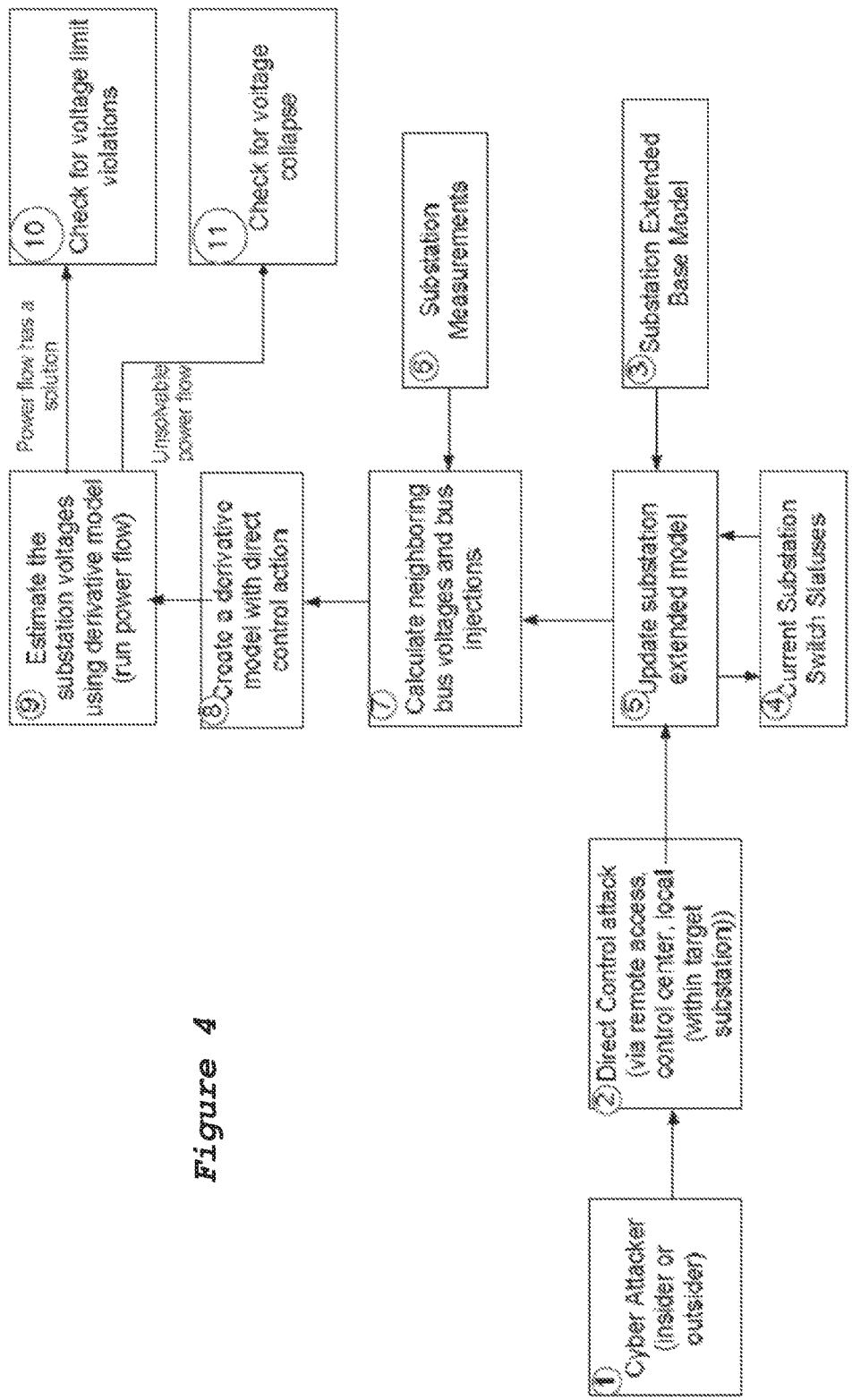
FIG. 4 illustrates details of an example technique for mitigating a direct control attack.

FIG. 4 shows a more detailed schematic of an attack mitigation process, according to an example implementation of the techniques described generally above. The numbered operations shown in FIG. 4 are described in more detail below.

1. A cyber attacker gains access to the substation communication network, gains an understanding of the equipment in the substation, and positions himself for a cyber-attack.

2. The cyber attacker sends a direct command to open or close a substation's circuit breaker. The command could come remotely through the power system control center or locally within the electrical substation.

3. The substation maintains its extended model. This extended substation model is a power flow model that includes impedances of substation level equipment and their connections, and extended to include bus voltages and switch statuses for neighboring substations connected directly to this substation. A base power flow problem is set up initially using the extended model's network impedance diagram and connectivity, as well as real and reactive power injections for buses, such as for loads and/or power generation. The slack bus for the model is identified—in one example implementation the slack bus can be assigned to the strongest electrical bus in the extended model. A base topology is identified—the base topology models the connectivity of the extended model and is based on interconnection of the local substation with its neighboring substations via transmission lines. The base topology has a base case status that is set by the normal status of the circuit breakers in this substation and its neighbors. A bus-admittance matrix Y is set up using normal topology information and branch/line parameters, such as the branches' resistances and inductances. The base model is stored in writeable media and in memory.

4. A direct control command to open a breaker triggers the monitoring of all circuit breaker statuses in the substation. (Alternatively, the circuit breaker statuses may be monitored periodically, at intervals that are short enough to ensure that the model is sufficiently current upon the triggering of a power flow analysis.)

5. The substation extended model is updated based on current circuit breaker statuses. This updating may be triggered by the direct command, in some embodiments, or performed periodically, in others.

6. The direct control command also triggers retrieving the most up to date analog measurements such as line flows and voltages within the substation. (Alternatively, the line flows, voltages, and any other measurement data in the substation may be monitored periodically, at intervals that are short enough to ensure that the model is sufficiently current upon the triggering of a power flow analysis.)

7. The voltages $V_r^c$ at the neighboring substations are estimated from the local voltages and line flows. Each remote substation bus voltage $V_r^c$ is calculated using a local substation voltage measurement $V_l^m$, local substation line flow measurement $I_{l-r}^m$, and the impedance of the branch between the local substation and the remote substation $Z_{l-r}$, that is:

$$V_r^c = V_l^m + I_{l-r}^m Z_{l-r}^m. \quad (1)$$

The equivalent load injection at the local substation is calculated based from the latest measurements.

Each of the real and reactive power injections $P_i$, $Q_i$ respectively, at the neighboring substations are estimated using the latest elements of the model's bus admittance matrix elements, the calculated voltages at the remote buses, and/or measured voltages at the local substation from above. The equation below is used to calculate these injections at each of the remote buses or substations:

$$\overline{S}_i = P_i + jQ_i = \overline{V}_i^* \Sigma_{k=1}^n \overline{Y}_{ik}^* \overline{V}_k^{c^*}, i=1,\ldots,n \text{ (excluding local substation)}. \quad (2)$$

8. The mitigation process identifies the target circuit breaker where direct control is requested. In some embodiments, for example, each output from a relay or actuator controlling a switch is provided as an input to the mitigation process. The process then determines whether there is a line or equipment outage resulting directly from the direct control command. Next, the process communicates with directly connected neighboring substations to determine the status of any other lines or equipment included in the model that are not connected directly to the substation. The process then updates the original bus admittance matrix Y, to yield a new matrix reflecting the system as it would be if the direct control command were executed.

Note that the determination whether an outage will exist could be done, for example using power system graphs. A branch outage or bus outage is removed from the original bus admittance matrix if after opening the target circuit breaker, the branch or bus will be removed and/or isolated, respectively.

After the bus admittance matrix is changed, an island finding module will find system islands and assign a slack bus (only if the island has a generator bus) for each island, for power flow calculations. After assigning the slack bus, the voltage V slack at that bus is set. The slack bus voltage is set equal to the calculated or measured voltage magnitude at that bus, with a reference voltage angle of zero. The voltage angles in the system are adjusted such that the slack bus becomes the new reference voltage for the system, as shown below, in Equation (3). These voltage magnitudes become the initial estimates for the power flow problem.

$$\theta_i^{new} = \theta_i^{old} - \theta_{slack}^{old}, \quad (3)$$

for all buses i in the system.

In one implementation, determining the candidate slack bus in the power flow problem could be based on determining the bus with the minimum Euclidian norm on the movement of the bus voltages from their averages observed over time, that is:

$$\min_i \|V_i(t) - \overline{V}_i\|, \quad (4)$$

where $V_i(t)$ are the observed bus voltages at bus i at various times t, and $\overline{V}_i$ is the calculated average of all these voltages at bus i.

9. A power flow program is run using the calculated injections $\overline{S}_i = P_i + jQ_i$ in each of the remote buses i, the measured injections at the local substation, the initial voltage estimates, the updated admittance matrix, as well as the slack bus information.

10. Check for voltage limit violation. If the power flow analysis results in a converged power flow, the result is predicted voltages $V_i^{pred}$ corresponding to the remote substation voltages $V_r^c$ and local substation voltages $V_l^m$. These predicted calculated voltages can then be compared to upper and/or lower thresholds $V_i^{theshold,upper}$ and $V_i^{theshold,upper}$. If, as a result of direct control of a circuit breaker, either of the following conditions is expected to occur, as assessed by the evaluation of the predicted voltages $V_i^{pred}$, then the process blocks or ignores the direct control request, and sends an alarm to the system and/or substation operators:

a. the voltage of one or more of the load buses will increase to more than a predetermined threshold, i.e., $V_i^{pred} > V_i^{theshold,upper}$, thereby potentially triggering overvoltage related protections that could trip more circuit breakers in the substation; and/or b. the voltage at one or more of the load buses will drop too low, i.e., $exV_i^{pred} < V_i^{theshold,lower}$, potentially triggering load shedding.

11. Check for potential voltage collapse. If as a result of direct control of a circuit breaker, the power flow could not converge, and if the Jacobian matrix of the substation extended model is evaluated to be singular, then the system could experience voltage collapse. In that situation, the process also blocks or ignores the direct control command, and sends an alarm to the system and/or substation operators.

Figure 5:
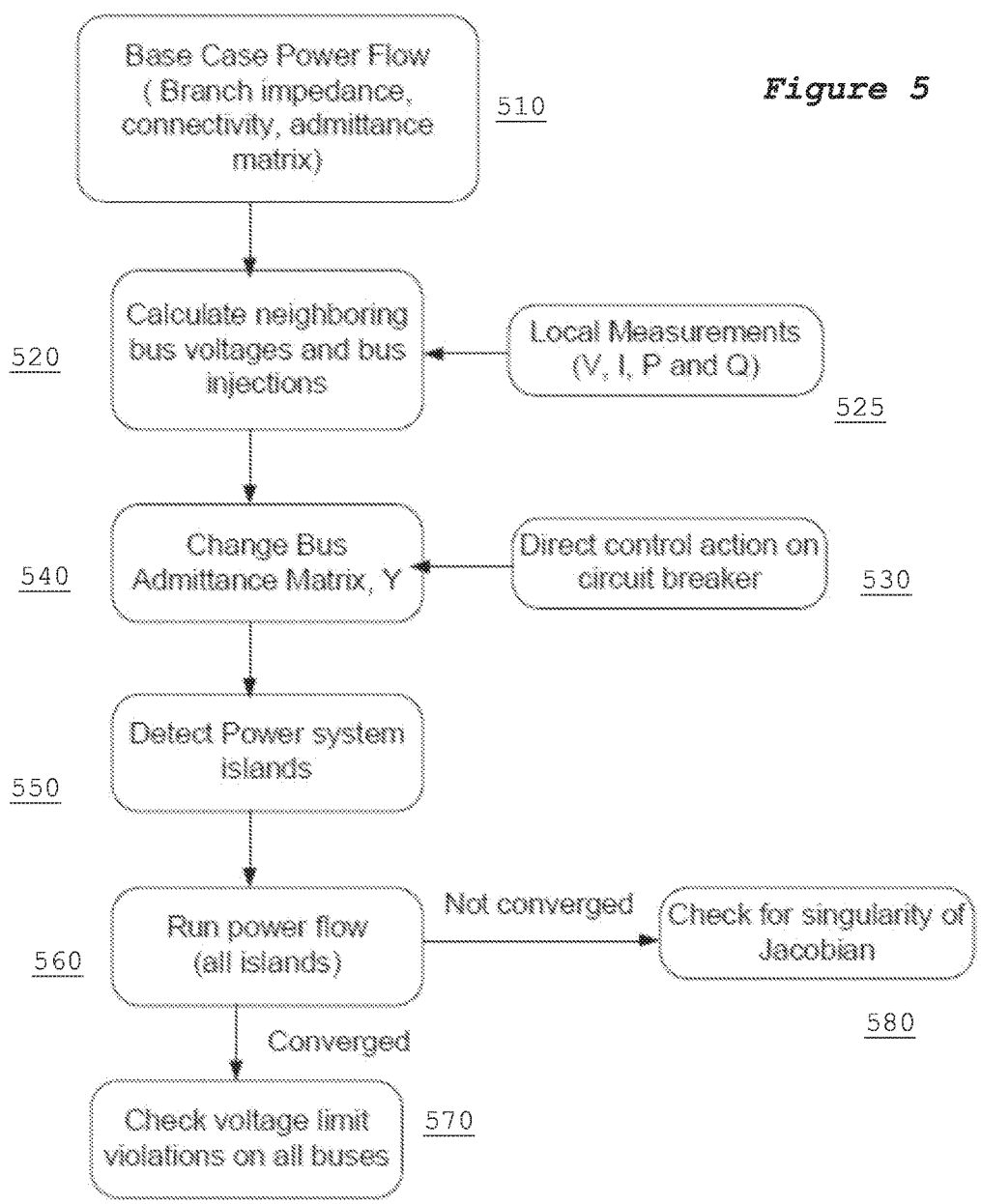
FIG. 5 is a process flow diagram illustrating an example method for mitigating a direct control attack.

FIG. 5 is a process flow diagram illustrating an example method according to the process described above. It will be appreciated that the various process steps illustrated in FIG. 5 were discussed in the description of FIG. 4, above.

As shown at block 510, the illustrated process flow begins with the generation of a base case power flow model, which includes branch impedances, connectivity, and an admittance matrix, modeling the substation and its directly connected neighboring substations.

As shown at block 520, neighboring bus voltages and bus injections are calculated, using local measurements, V, I, P, and Q, as shown at block 525.

Block 530 illustrates a direct control command for opening or closing a circuit breaker. This triggers the generation of a modified extended substation model, based on the base case power flow model, which is updated with current voltages and power injections for the substation and its directly connected neighbors. This modified extended substation model is modified through the changing of the bus admittance matrix Y, based on the changes to the system topology that would result from execution of the direct control command.

As shown at block 550, power system islands are detected, based on the modified bus admittance matrix Y. As shown at block 560, a power flow analysis is executed for each of the detected islands. If a given power flow analysis converges, the resulting predicted voltages are compared to predetermined voltage limits, or thresholds, as shown at block 570, to detect voltage violations on the modeled buses. A voltage violation triggers the blocking of the command and, in some embodiments, the generation of an alarm. If a given power flow analysis fails to converge, on the other hand, the process checks for singularity of the Jacobian matrix of the model, as shown at block 580. If the Jacobian matrix of the modeled system is singular, the system could experience voltage collapse—hence, the command is blocked and an alarm is generated.

The techniques described above and illustrated in FIGS. 4 and 5 use real-time measurements, as well as branch information of adjacent lines, to calculate unknown values and power flows. IEC 61850-90-1, which is in its early stage of development, describes the use of the IEC 61850 standard for communication between substations, and some vendors have already implemented this feature in their products. A target substation implementing the techniques described herein may thus get all necessary information from adjacent substations using IEC 61850-90-1 based communication, in some embodiments.

Figure 6:
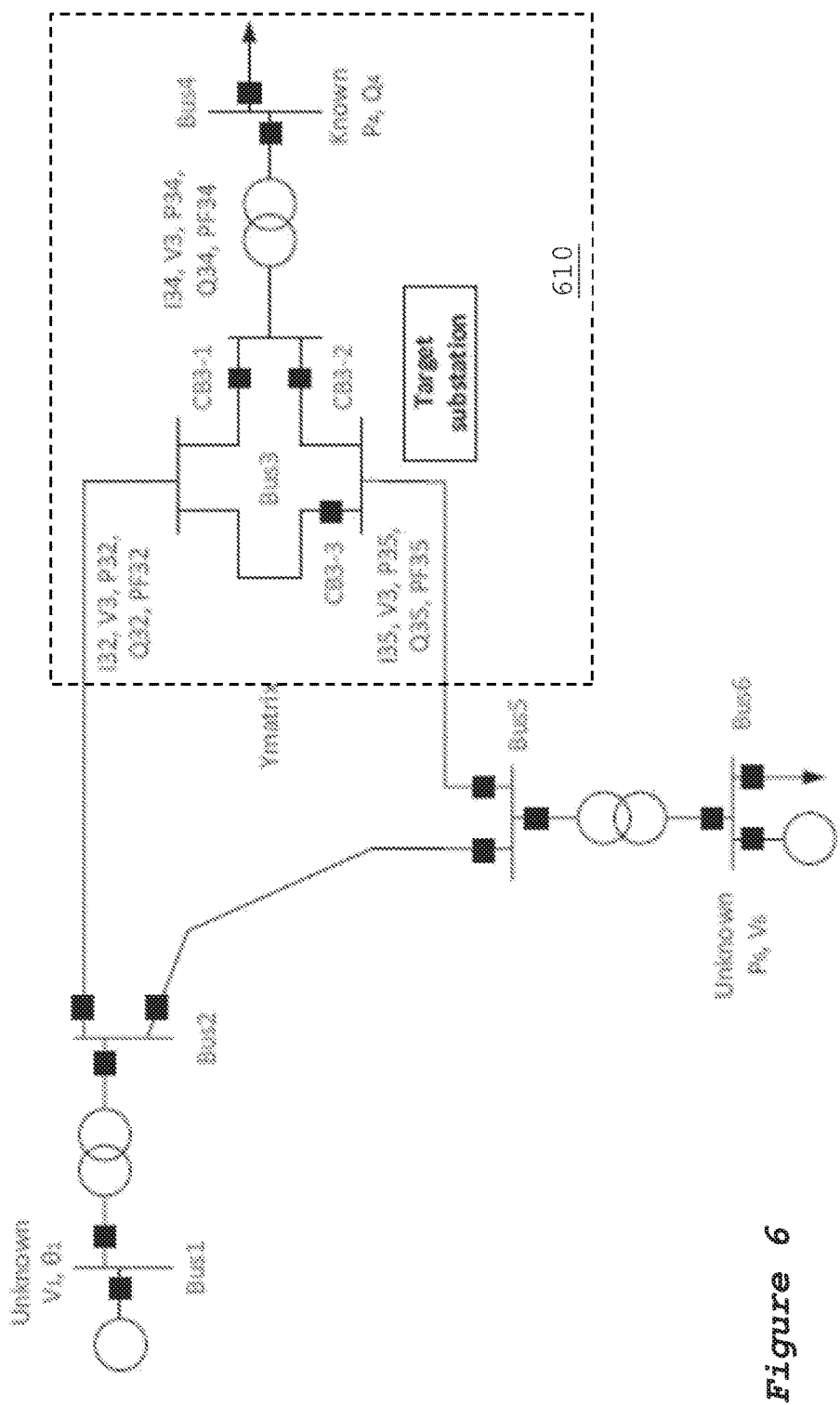
FIG. 6 illustrates an example scenario involving a target electric power substation and neighboring electric power substation.

FIG. 6 illustrates an example substation extended model from the point of view of a target substation 610, using a single-line diagram. The figure illustrates the target substation 610 as well as its connectivity with neighboring substations.

The system shown in FIG. 6 can be used for a case study. It has two generators, three transformers and two loads. The target substation 610 has a step down transformer, and three circuit breakers at the high voltage side. The target substation has current transformers (CTs) and voltage transformers (VTs) at each line, i.e., line 32, line 34 and line 35, from which voltages and currents can be measured in real-time.

From the measurements, active power (P), reactive power (Q) and power factor (PF) can be calculated for each line. There are four unknown values (i.e., $V_1$, $\theta_1$, $P_6$, and $Q_6$) in this power system, and they have to be calculated in order to run the power flow as follows.

First, as described in Equation (5) and Equation (6), the voltages of bus 2 and bus 5 can be calculated from the flow measurements at the target substation as:

$$V_2 = I_{2\text{-}3} * Z_{2\text{-}3} + V_3, \text{and} \quad (5)$$

$$V_5 = I_{5\text{-}3} * Z_{5\text{-}3} + V_3 \quad (6)$$

The transformer ration can be used for calculating the bus voltages at the other side of the transformers, that is:

$$V_i = (V_i \angle \theta_j) \times \left(\frac{V_i}{V_j}\right). \quad (7)$$

Equations (8) and (9) show the calculation result for bus voltages 1 and 6, respectively:

$$V_1 = (V_2 \angle \theta_2) \times \left(\frac{13.8}{500}\right), \quad (8)$$

$$V_6 = (V_5 \angle \theta_5) \times \left(\frac{161}{500}\right). \quad (9)$$

At this point, all the remote bus voltages have been assigned calculated values. The power injections at each bus in the substation extended model can now be calculated using these bus voltage and line impedance information, as shown in Equation (10):

$$\overline{S}_i = P_i + jQ_i = \overline{V}_i * \Sigma_{k=1}^n \overline{Y_{ik}^*} * \overline{V_k^{c*}}. \quad (10)$$

As shown in Equation (11), power injection to bus 5 is calculated as:

$$\overline{S}_5 = P_5 + jQ_5 = \overline{V}_5 * \Sigma_{k=1}^6 \overline{Y_{5k}^*} * \overline{V_k^{c*}}. \quad (11)$$

Once all bus injections are calculated, the attack mitigation process will change the input data for power flow calculation, based on the direct control request. For example, the bus admittance matrix Y will be changed if the consequence of the direct control request will change the power system topology, and load data will be changed if the target circuit breaker is connected to a load directly.

In the scenario illustrated in FIG. 6, assume there is a direct control request to circuit breaker CB 3-1, followed by a direct control request to circuit breaker CB 3-2. The attack mitigation process will first run the power flow analysis using a modified extended substation model that reflects the status of the system after opening CB 3-1. At this stage, there is no over-voltage or under-voltage limits violation, since the opening of CB 3-1 does not change the bus admittance matrix, as there is no change in the connectivity of the lines in the power flow model relative to the base topology for the target substation. Accordingly, this first direct control request will be allowed, thus opening circuit breaker CB 3-1.

When there is a subsequent second direct control request (i.e., after CB 3-1 is opened) to open circuit breaker CB 3-2, the attack mitigation process described above will change the bus admittance matrix in generating the modified extended substation model, since line 34 and bus 4 would be disconnected by the opening of circuit breaker CB 3-2. The process then finds the system islands, if any. Then it will check unmonitored line statuses (e.g., line 25) by communications, and finally a power flow is run.

In this particular scenario, even though the consequence of the direct control command is the creation of two islands, the island that contains bus 4 doesn't have a generator. This information is logged, and the process then calculates a power flow for one island that contains buses 1 (slack bus) and 6 (generator bus). In this scenario, there is an over-voltage limits violation (120 percent over the nominal value) at bus 3. The attack mitigation process will then block the second direct control request (the CB 3-2 open request), and will send an alarm to substation and control center operators.

It should be noted that the techniques described above are applicable in any electrical substations, with various circuit breaker topologies, such as one-bus-one-breaker, double-bus-double-breaker, or breaker-and-one-half schemes.

Figure 7:
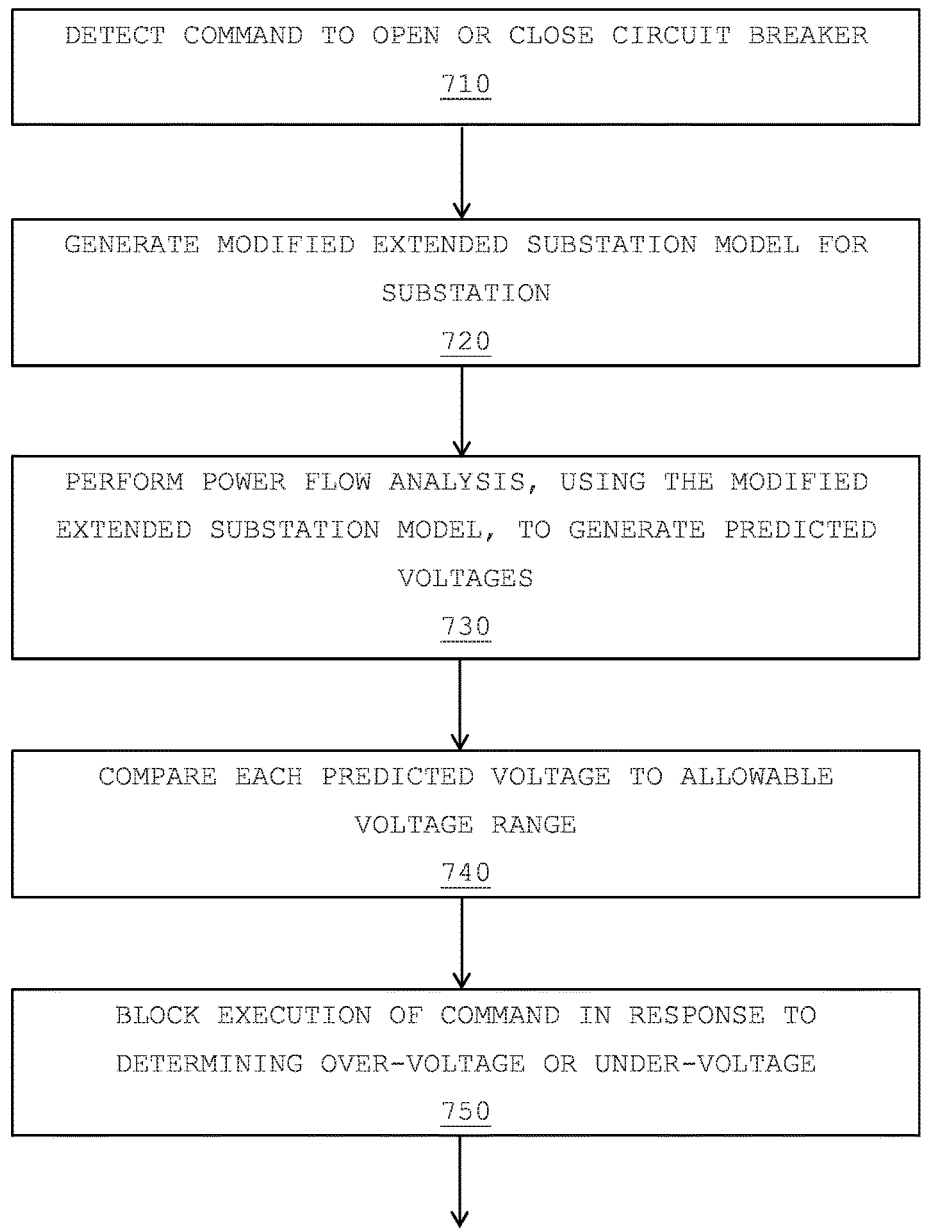
FIG. 7 is a process flow diagram illustrating an example method according to the techniques detailed herein.

Given the detailed examples and explanation provided above, it will be appreciated that FIG. 7 is a process flow diagram illustrating a generalized method for mitigating direct control attacks on electric power substations, as implemented in at least one device in a target power substation. It will be appreciated that the illustrated method corresponds, at least generally, to the examples illustrated in FIGS. 3, 4, and 5, as well as to the detailed example discussed in connection with the scenario illustrated in FIG. 6, such that the variations and details discussed in connection with any of those figures may be applied to the process flow in FIG. 7, and vice versa.

The method includes, as shown at block 710, detecting a command to open or close a circuit breaker in the electric power substation. As shown at block 720, a modified extended substation model for the electric power substation is generated, based on the detected command and based on measurements in the electric power substation. This modified extended substation model is a power flow model for the electric power substation and for one or more directly connected neighboring substations.

As shown at block 730, the method further includes performing a power flow analysis, using the modified extended substation model, to generate a predicted voltage for each of a plurality of nodes in the electric power substation and in the one or more directly connected neighboring substations. Each of the predicted voltages is compared to a corresponding allowable voltage range, as shown at block 740. Finally, as shown at block 750, execution of the command is blocked, in response to determining that one or more of the voltages is outside the corresponding allowable voltage range.

In view of the discussion above, it will be appreciated that the method shown generally in FIG. 7 may further include the generating of a base extended substation model for the electric power substation, based on measurements in the electric power substation and status information for the one or more directly connected neighboring substations, the base extended substation model comprising an admittance matrix representing the connectivity in the electric power substation and in and to the directly connected neighboring substations. Thus, generating the modified extended substation model for the electric power substation (as shown in block 720) comprises modifying the admittance matrix to reflect a connectivity that would result from executing the command to open or close the circuit breaker. In some embodiments, generating this base extended substation model is triggered by the detecting the command to open or close the circuit breaker. This generating of the base extended substation model may comprise retrieving current measurement data for each of a plurality of monitored points in the electric power substation, for use in performing the power flow analysis.

In some embodiments of the method illustrated in FIG. 7, performing the power flow analysis, using the modified extended substation model, comprises detecting power system islands, based on the modified extended substation model, and running a power flow analysis for each detected power system island that includes a generator. Further details of the power flow analysis were described above.

Figure 8:
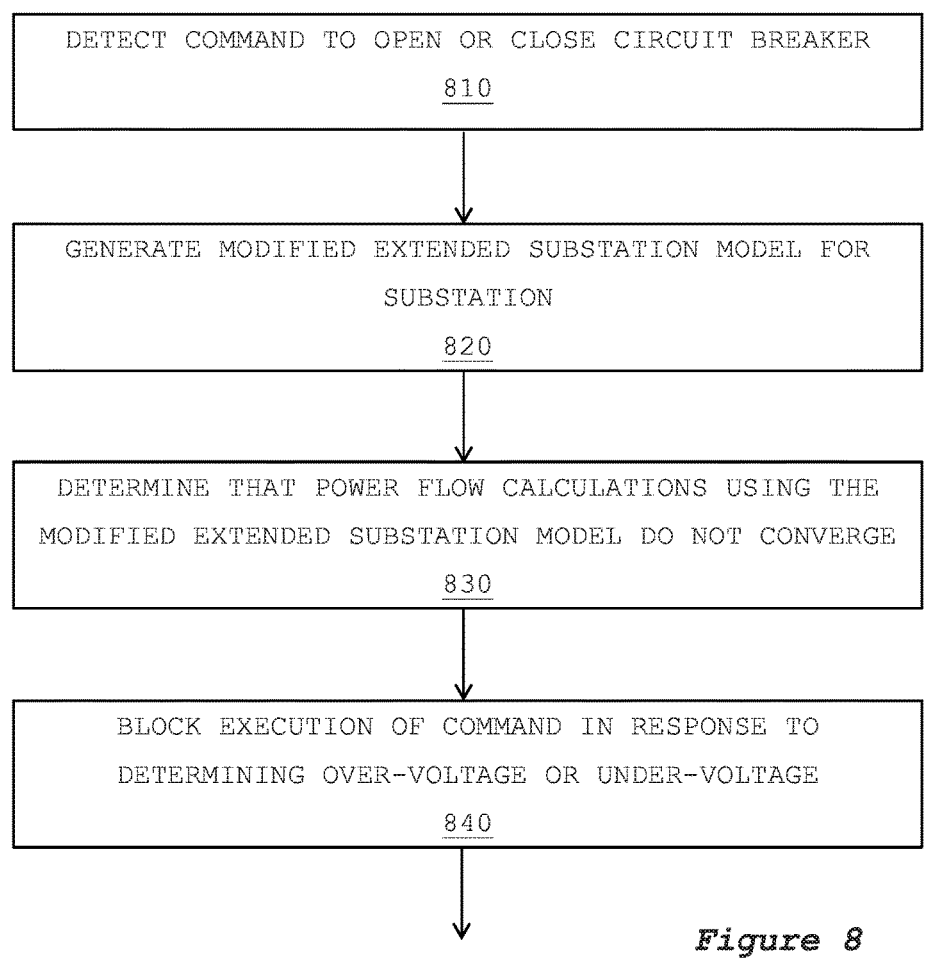
FIG. 8 is a process flow diagram illustrating another example method according to the techniques detailed herein.

FIG. 8 illustrates a variant of the method shown in FIG. 7, illustrating the case where the power flow analysis does not converge. As was the case with the method shown in FIG. 7, the method shown in FIG. 8 begins with detecting a command to open or close a circuit breaker in the electric power substation, as shown at block 810. Likewise, the method further comprises generating a modified extended substation model for the electric power substation, based on the detected command and based on measurements in the electric power substation, as shown at block 820. Again, the modified extended substation model is a power flow model for the electric power substation and for one or more directly connected neighboring substations.

As shown at block 830, however, in this example method, it is determined that power flow calculations using the modified extended substation model do not converge. As shown at block 840, the execution of the command is blocked in response to said determining. It will be appreciated that this blocking may be further in response to determining that a Jacobian matrix of the modified extended substation model is evaluated to be singular, in some embodiments.

Figure 9:
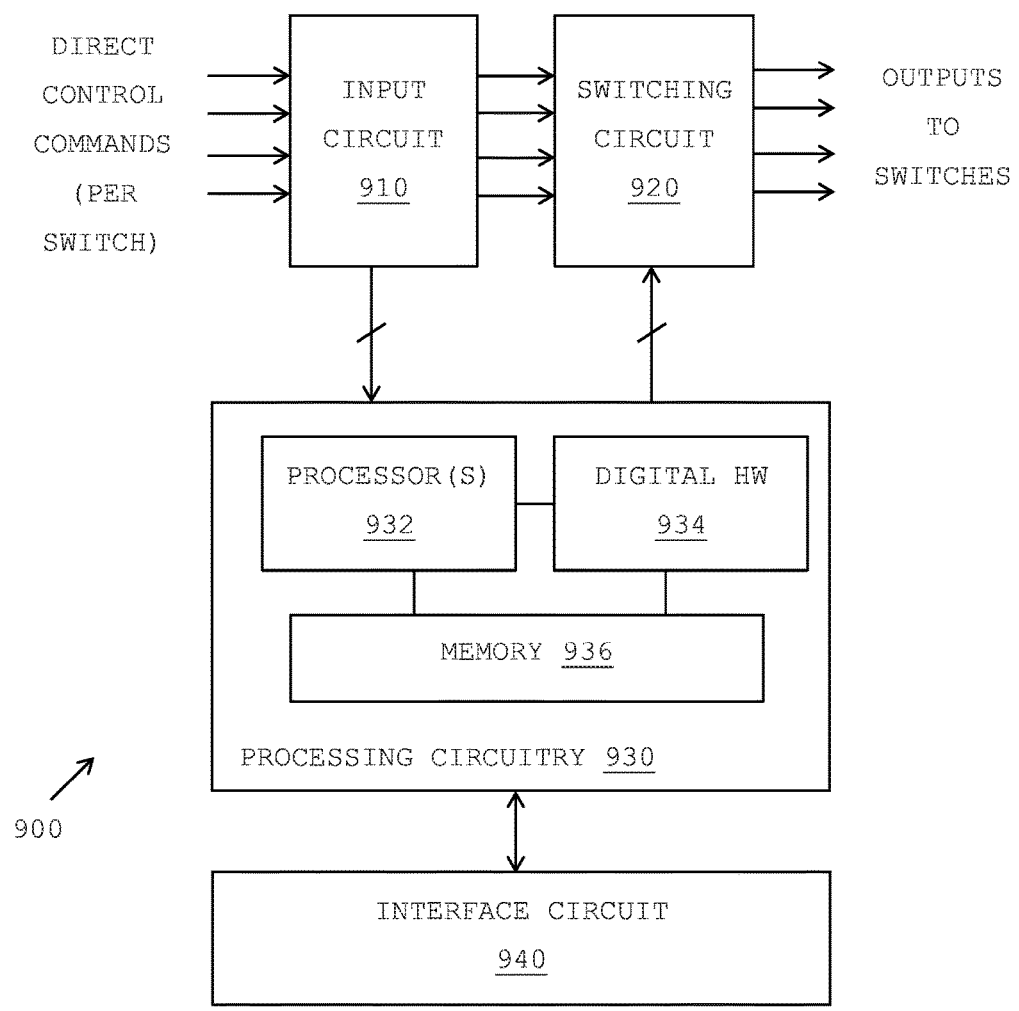
FIG. 9 is a block diagram illustrating components of an example control device according to several embodiments of the apparatuses disclosed herein.

The methods described above may be implemented in a computer system operatively connected to components in the electric power substation. An example control device 900 configured to carry out one or more of the disclosed methods is shown in FIG. 9 and includes an input circuit 910 configured to receive, for each of one or more switches in the electric power substation, direct control commands for opening and/or closing the switch, as well as an interface circuit 940 configured to receive measurement data for a plurality of monitored points in the electric power substation and to receive communicated status information from one or more neighboring substations directly connected to the electric power substation. The control device 900 further includes a processing circuit 930 operatively connected to the interface circuit; this processing circuit 930 in turn includes, in the illustrated example, one or more processors 932 (e.g., one or microcontrollers, microprocessors, digital signal processors, or the like), digital hardware 934 (which may include clock circuits, logic circuits, etc.), and memory 936. Memory 936, which may include any of various combinations of volatile and/or nonvolatile memory, stores program code for execution by processors 932 and program data, such as parameters and other details of the substation models discussed above.

With this program code, the processing circuit 930 is configured, according to some embodiments, to carry out one or more of the methods discussed above. For example, the processing circuit 930 may be configured to: detect a command to open or close a circuit breaker in the electric power substation; generate a modified extended substation model for the electric power substation, based on the detected command and based on measurements in the electric power substation, where the modified extended substation model is a power flow model for the electric power substation and for one or more directly connected neighboring substations; perform a power flow analysis, using the modified extended substation model, to generate a predicted voltage for each of a plurality of nodes in the electric power substation and in the one or more directly connected neighboring substations; compare each of the predicted voltages to a corresponding allowable voltage range; and block execution of the command in response to determining that one or more of the voltages is outside the corresponding allowable voltage range.

The control device 900 shown in FIG. 9 further comprises a switching circuit 940 coupled to the processing circuit 930 and operative to selectively connect direct control commands received at each input of the input circuit 910 to a corresponding output, under the control of the processing circuit 930. The processing circuit 930 is configured to allow execution of a direct control command by controlling the switching circuit 940 to connect the direct control command received at a given input of the input circuit 910 to the corresponding output of the switching circuit 940, and to block execution of a direct control command by refraining from controlling the switching circuit 940 to connect the direct control command received at a given input of the input circuit 910 to the corresponding output of the switching circuit 940.

The techniques and apparatus described above can be used for several purposes, e.g., as follows:

- For monitoring, logging, and alarming malicious cyber activities affecting an electrical substation via the direct control of circuit breakers or other switches.
- For blocking and reporting malicious direct control attempts on electrical substation equipment that could result in load isolation, over-voltage or under-voltage conditions within the substation and its adjacent substations, and voltage collapse within the substation and its adjacent substations.

For blocking and reporting malicious direct control attempts on electrical substation equipment, by predicting abnormal voltages based on a power flow model of the target substation and its immediate neighboring substations.

For blocking and reporting malicious direct control attempts on electrical substation equipment, by predicting the occurrence of voltage collapse on the target substation and its immediate neighboring substations.

For blocking and reporting malicious direct control attempts on electrical substation equipment, using a real-time power model based on observed measurements at the target substation and estimation of the power flow quantities at the neighboring substation.

As discussed cyber security is a big concern in the power system operation, since malicious control of circuit breakers and other switches in electric power substations may trigger a cascading event and system blackout. Therefore, many government agencies, universities and vendors are working on cyber security mitigations in order to detect, mitigate and restore the power system as soon as possible after cyber attacks. One of the main mitigation methods is to use cyber devices to detect the cyber intrusions, e.g., intrusion detection system (IDS), intrusion prevention system (IPS), and firewall. However, it has been reported that IDS and IPS have a false negative ratio and false positive ratio that are very hard to reduce. Furthermore, a firewall is an access control device, so it can't detect any activities once attacker(s) passed the firewall. The performance of cyber mitigation methods rely exclusively on the Information and Communication Technology systems, so they have a potential risk for a hacker to penetrate this barrier.

The techniques and apparatus described herein, on the other hand, use the physics of the power system to detect both cyber and physical intrusions that execute a direct control attack (e.g., to open a circuit breaker in a substation). Therefore, it doesn't rely on the performance of an Information and Communication Technology system. Since the techniques described herein utilize a reduced power system model, based on real-time measurements and branch information of adjacent buses for power flow calculation, power system information does not need to be obtained from a control center for power flow calculation resulting in timely decisions to block malicious attempts to directly control substation switching equipment. Another advantage is that the described techniques can be used to calculate all unknown values using real-time measurements, and apply the latest load values so that the prediction of the outcome of the direct control is more reliable and reflects existing conditions in the power system and the substation.

The techniques and apparatus described herein also can make a significant benefit to existing substation systems as follows.

(1) The described techniques can be run from existing substation devices, e.g., in protective relay (IED), gateway, or user interface devices, in order to enhance the cyber security of the substations. Therefore, existing systems can know the consequences of a direct control command, and operators can make an informed decision as to whether they want to execute the command or not.

(2) The techniques can be used to detect the fault data injection attacks (between substations and control center). As explained above, measurements from substations are used as input to EMS software applications, and circuit breaker status is one of the key points for these applications. Hence, any fault CB status injection attack may lead to a wrong result of these applications, and then it may lead to a wrong decision from control center operators. However, the techniques described herein will run extended power flow using local substation measurements, detecting any fault data injection attacks between substation and control center by comparing those two results (i.e., power flow result, and communication between substation and control center).

(3) The techniques described herein can benefit from incorporating an optional feedback loop between the substation and control center that may be used to validate the control command. In some cases, the operator may be aware of the consequence of the control action and still would like to proceed with the action to avert a much larger risk. For instance, control center operators may need to shed a load in order to avoid a bigger system blackout. While the techniques and apparatus described herein may detect and initially block the direct control commands used in such a scenario, override mechanisms may be included to force the commands to be executed anyway. It will be appreciated that further security mechanisms will need to be applied to secure these override mechanisms.

Detailed examples of several embodiments of the present invention have been described above. Of course, it should be understood that the present invention is not limited to any particular example given in the foregoing description, nor is it limited by the accompanying drawings. Instead, the present invention is limited only by the following claims and their legal equivalents.

What is claimed is:

1. A method, performed in at least one device in an electric power substation, the method comprising:
   detecting a command to open or close a circuit breaker in the electric power substation;
   generating a modified extended substation model for the electric power substation, based on the detected command and based on measurements in the electric power substation, wherein the modified extended substation model is a power flow model for the electric power substation and for one or more directly connected neighboring substations;
   performing a power flow analysis, using the modified extended substation model, to generate a plurality of predicted voltages, each of the predicted voltages for each of a plurality of nodes in the electric power substation and in the one or more directly connected neighboring substations;
   compare the each of the predicted voltages to a corresponding allowable voltage range; and
   blocking execution of the command in response to determining that one or more of the predicted voltages are outside the corresponding allowable voltage range.

2. The method of claim 1, wherein the method further comprises generating a base extended substation model for the electric power substation, based on measurements in the electric power substation and status information for the one or more directly connected neighboring substations, the base extended substation model comprising an admittance matrix representing the connectivity in the electric power substation and in and to the directly connected neighboring substations, and wherein generating the modified extended substation model for the electric power substation comprises modifying the admittance matrix to reflect a connectivity that would result from executing the command to open or close the circuit breaker.

3. The method of claim 2, wherein generating the base extended substation model is triggered by the detecting the command to open or close the circuit breaker, and wherein said generating comprises retrieving current measurement data for each of a plurality of monitored points in the electric power substation, for use in performing the power flow analysis.

4. The method of claim 1, wherein performing the power flow analysis, using the modified extended substation model, comprises detecting power system islands, based on the modified extended substation model, and running a power flow analysis for each detected power system island that includes a generator.

5. A control device for use in an electric power substation, the control device comprising:
- an input circuit configured to receive, for each of one or more switches in the electric power substation, direct control commands for opening and/or closing the switch;
- an interface circuit configured to receive measurement data for a plurality of monitored points in the electric power substation and to receive communicated status information from one or more neighboring substations directly connected to the electric power substation; and
- a processing circuit operatively connected to the interface circuit and the input circuit configured to:
- detect a command to open or close a circuit breaker in the electric power substation;
- generate a modified extended substation model for the electric power substation, based on the detected command and based on measurements in the electric power substation, wherein the modified extended substation model is a power flow model for the electric power substation and for one or more directly connected neighboring substations;
- perform a power flow analysis, using the modified extended substation model, to generate a plurality of predicted voltages, each of the predicted voltages for each of a plurality of nodes in the electric power substation and in the one or more directly connected neighboring substations;
- compare the each of the predicted voltages to a corresponding allowable voltage range; and
- block execution of the command in response to determining that one or more of the predicted voltages are outside the corresponding allowable voltage range.

6. The control device of claim 5, further comprising, a switching circuit coupled to the processing circuit and operative to selectively connect direct control commands received at each input of the input circuit to a corresponding output, under the control of the processing circuit, wherein the processing circuit is configured to allow execution of a direct control command by controlling the switching circuit to connect the direct control command received at a given input of the input circuit to the corresponding output of the switching circuit and to block execution of a direct control command by refraining from controlling the switching circuit to connect the direct control command received at a given input of the input circuit to the corresponding output of the switching circuit.

7. The control device of claim 5, wherein the processing circuit is further configured to generate a base extended substation model for the electric power substation, based on measurements in the electric power substation and status information for the one or more directly connected neighboring substations, the base extended substation model comprising an admittance matrix representing the connectivity in the electric power substation and in and to the directly connected neighboring substations, and wherein the processing circuit is configured to generate the modified extended substation model for the electric power substation by modifying the admittance matrix to reflect a connectivity that would result from executing the command to open or close the circuit breaker.

8. The control device of claim 7, wherein the processing circuit is configured to generate the base extended substation model in response to detecting the command to open or close the circuit breaker, and wherein said generating comprises retrieving current measurement data for each of a plurality of monitored points in the electric power substation, for use in performing the power flow analysis.

9. The control device of claim 5, wherein the processing circuit is configured to perform the power flow analysis, using the modified extended substation model, such that said power flow analysis comprises detecting power system islands, based on the modified extended substation model, and running a power flow analysis for each detected power system island that includes a generator.

* * * * *